United States Patent
Paul et al.

(10) Patent No.: US 7,979,867 B2
(45) Date of Patent: Jul. 12, 2011

(54) MANAGING A DEVICE IN A DISTRIBUTED FILE SYSTEM, USING PLUG AND PLAY

(75) Inventors: Vipul Paul, Hillsboro, OR (US); Vikas Ahluwalia, Kirkland, WA (US)

(73) Assignee: International Business Machines Corporation, Armonk, NY (US)

( * ) Notice: Subject to any disclaimer, the term of this patent is extended or adjusted under 35 U.S.C. 154(b) by 999 days.

(21) Appl. No.: 11/420,761

(22) Filed: May 28, 2006

(65) Prior Publication Data

US 2007/0276966 A1   Nov. 29, 2007

(51) Int. Cl.
*G06F 13/00* (2006.01)

(52) U.S. Cl. ........ 719/321; 709/217; 709/218; 709/223; 709/224

(58) Field of Classification Search .......................... None
See application file for complete search history.

(56) References Cited

U.S. PATENT DOCUMENTS

| | | | | |
|---|---|---|---|---|
| 6,697,924 B2 * | 2/2004 | Swank | ........................... | 711/163 |
| 6,779,064 B2 | 8/2004 | McGowen et al. | | |
| 6,820,146 B2 * | 11/2004 | Cox | .................. | 710/74 |
| 6,854,035 B2 * | 2/2005 | Dunham et al. | ............... | 711/117 |
| 6,892,264 B2 * | 5/2005 | Lamb | ........................... | 710/301 |
| 6,920,494 B2 * | 7/2005 | Heitman et al. | ............... | 709/223 |
| 6,952,698 B2 * | 10/2005 | Delaire et al. | .................... | 707/10 |
| 6,996,670 B2 * | 2/2006 | Delaire et al. | ................. | 711/114 |
| 7,069,395 B2 * | 6/2006 | Camacho et al. | .............. | 711/152 |
| 7,080,140 B2 * | 7/2006 | Heitman et al. | ............... | 709/224 |
| 7,137,124 B2 * | 11/2006 | Lamb et al. | .................... | 719/321 |
| 7,171,624 B2 * | 1/2007 | Baldwin et al. | ................ | 715/734 |
| 7,177,935 B2 * | 2/2007 | Bradshaw et al. | ............. | 709/226 |
| 7,287,063 B2 * | 10/2007 | Baldwin et al. | ................ | 709/216 |
| 7,430,593 B2 * | 9/2008 | Baldwin et al. | ................ | 709/223 |
| 7,457,846 B2 * | 11/2008 | Baldwin et al. | ................ | 709/217 |
| 7,499,986 B2 * | 3/2009 | Axberg et al. | ................. | 709/221 |
| 2002/0069245 A1 * | 6/2002 | Kim | ................ | 709/203 |
| 2003/0093509 A1 * | 5/2003 | Li et al. | ......................... | 709/223 |
| 2003/0149762 A1 * | 8/2003 | Knight et al. | .................. | 709/224 |
| 2003/0154271 A1 * | 8/2003 | Baldwin et al. | ................ | 709/223 |
| 2003/0179227 A1 * | 9/2003 | Ahmad et al. | ................. | 345/736 |
| 2004/0064828 A1 | 4/2004 | Cox | | |
| 2004/0107422 A1 * | 6/2004 | Cabrera et al. | ................ | 719/310 |
| 2005/0044555 A1 | 2/2005 | Cox | | |
| 2005/0172046 A1 | 8/2005 | Goodwin | | |

* cited by examiner

*Primary Examiner* — Hyung S Sough
*Assistant Examiner* — Kimberly Jordan
(74) *Attorney, Agent, or Firm* — Century IP Group, Inc.; F. Jason Far-hadian, Esq.

(57) ABSTRACT

Systems and methods for managing a device in a distributed file system are provided. In one embodiment, the method comprises instantiating a physical device object, in response to a file system driver detecting a device remotely connected to a computing system via a distributed network. An operating system running on the computing device loads a disk function driver for managing access to the device. A plug and play manager of the operating system enumerates the device. The disk function driver instantiates and registers a functional device object with a mount manager of the operating system. A file system instantiates a volume device object for a logical drive volume mapped to the device and the mount manager mounts the volume device object on the functional device object.

13 Claims, 4 Drawing Sheets

MANAGING A DEVICE IN A DISTRIBUTED FILE SYSTEM, USING PLUG AND PLAY

COPYRIGHT & TRADEMARK NOTICES

A portion of the disclosure of this patent document contains material which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to file system management in a computing environment and, more particularly, to a system and method for automatically managing a device in a distributed file system, using the plug and play (PnP) feature of an operating system running on a local computing system.

BACKGROUND

A distributed file system, such as a storage area network file system (SANFS) developed by International Business Machines (IBM®), is utilized for managing access to files and data stored on a storage area network (SAN). A distributed file system provides access to file system clusters (i.e., distributed storage devices) by associating each cluster with a disk device object. The disk device object is created by a disk device driver and logically represents a corresponding cluster to the operating system of a computer. The operating system communicates with the disk device object to manage access to the cluster.

Unfortunately, most operating systems (e.g., Microsoft Windows®), that run on a local computer connected to a distributed network, do not support access to remote devices in distributed file systems. For example, the currently available disk drivers (e.g., IFS drivers) cannot create a disk device object for a remotely attached storage device (e.g., a SANFS cluster), such that the disk device object can directly interface with various components of the operating system. More particularly, the device drivers cannot create a disk device object so that the remote storage device can interface with the operating system's plug and play (PnP) manager.

For the above reasons, the PnP manager cannot dynamically detect the arrival or removal of the remote device on a distributed network. For example, certain components of the Microsoft Windows operating system, such as Microsoft Windows Explorer™, cannot detect changes in status of a remote storage device in a distributed network. Manual methods have been implemented to allow applications executing over the operating system to detect a remote device and its corresponding status. Unfortunately, such methods are burdensome and fail to provide a robust interface between the operating system and the remote device.

Thus, methods and systems are needed that can overcome the above shortcomings.

SUMMARY

The present disclosure is directed to a system and corresponding methods that facilitate the automatic detection of a device in a distributed file system.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for managing a device in a distributed file system comprises instantiating a physical device object in response to a file system driver detecting a device (e.g., a SANFS cluster) connected to a distributed network, loading a disk function driver for managing access to the device, and notifying a PnP manager of an operating system running on a computing system to enumerate the device.

In certain embodiments, the method further comprises instantiating and registering a functional device object with a mount manager of the operating system, associating the functional device object with the physical device object, instantiating a volume device object for a logical drive volume mapped to the device, enabling an interface mechanism of the functional device object, and mounting the volume device object on the functional device object.

In accordance with another embodiment, a computer program product comprising a computer usable medium having a computer readable program is provided. The computer readable program when executed on a computer causes the computer to perform the above-disclosed actions to manage the device in the distributed file system.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Numeral references do not connote a particular order of performance, hierarchy or importance, unless otherwise stated herein. Features, elements, and aspects of the invention that are referenced by the same numerals in different figures represent the same, equivalent, or similar features, elements or aspects, in accordance with one or more embodiments.

DETAILED DESCRIPTION OF EXEMPLARY EMBODIMENTS

The present disclosure is directed to systems and corresponding methods that facilitate the automatic detection of a device in a distributed file system, using the plug and play (PnP) feature of an operating system running on a local computing system.

To accomplish this, a disk bus driver creates a physical device object, in response to a file system driver detecting a device connected to the computing system via a distributed network. The operating system's plug and play manager enumerates the device and causes a disk function driver to register a functional device object with a mount manager of the operating system. A file system creates a volume device object to represent a logical drive volume mapped to the device. The mount manager mounts the volume device object on the functional device object and notifies the operating system of the arrival of the device on the bus.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

Figure 1:
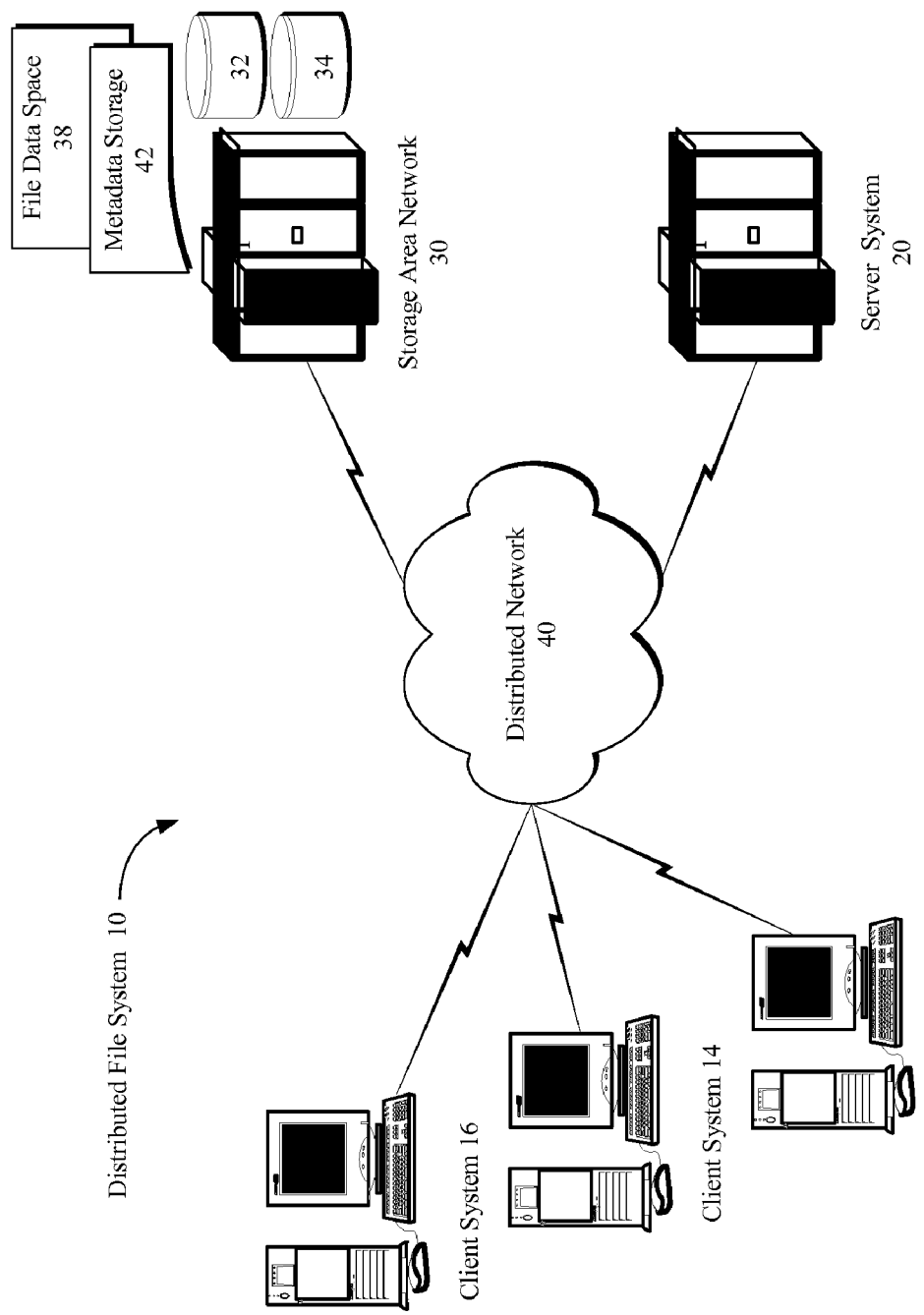
FIG. 1 illustrates a distributed network environment, wherein a plurality of client systems can access information stored on a storage area network (SAN), in accordance with one aspect of the invention.

Referring to FIG. 1, a distributed file system 10 in accordance with one aspect of the invention comprises a server system 20, a plurality of client systems 12, 14 and 16, a storage area network (SAN) 30 and preferably a metadata storage 42. Metadata is information pertaining to location and attributes of files managed by a distributed file system.

Each client system 12, 14, 16 can communicate with server system 20, or a plurality of sever systems (not shown), over a distributed network 40. The client and server systems are in communication with SAN 30 to access information stored therein. SAN 30 may comprise a plurality of shared disks 32 and 34 that contain blocks of data for files managed by the distributed file system. SAN 30, for example, may comprise at least one of a hard disk drive, a tape drive, an optical disk drive, a floppy drive, flash memory, another type of data storage medium, or a combination thereof.

Server system 20 may be implemented to execute software that manages the metadata stored in metadata storage 42. Each client system 12, 14, 16 can access an object or multiple objects stored on file data space 38 of SAN 30. In certain embodiments, client systems 12, 14, 16 may not have direct access to metadata storage 42, and thus communicate with server 20 to obtain the related information.

To access the contents of a file on SAN 30, client system 12 contacts server system 20 to obtain object metadata and locks. As noted earlier, the metadata provides information about a file, such as file attributes and storage location. Locks provide information about privileges needed to open a file and read or write data. Server system 20 performs a look-up of metadata information for the requested file within metadata storage 42.

In one embodiment, server system 20 communicates granted lock information and file metadata to requesting client system 12, including the addresses of all data blocks making up the file. Once client system 12 holds a lock and knows the data block address or addresses, client system 12 can access the data for the file directly from shared storage devices 32 or 34 attached to SAN 30.

It is noteworthy that the elements in distributed file system 10, as illustrated in FIG. 1, are exemplary in nature. Distributed file system 10 in addition to server system 20, client machines 12, 14, 16 and storage media 32, 34 may include additional or fewer elements, without detracting from the scope of the invention or the principals disclosed herein.

Figure 2:
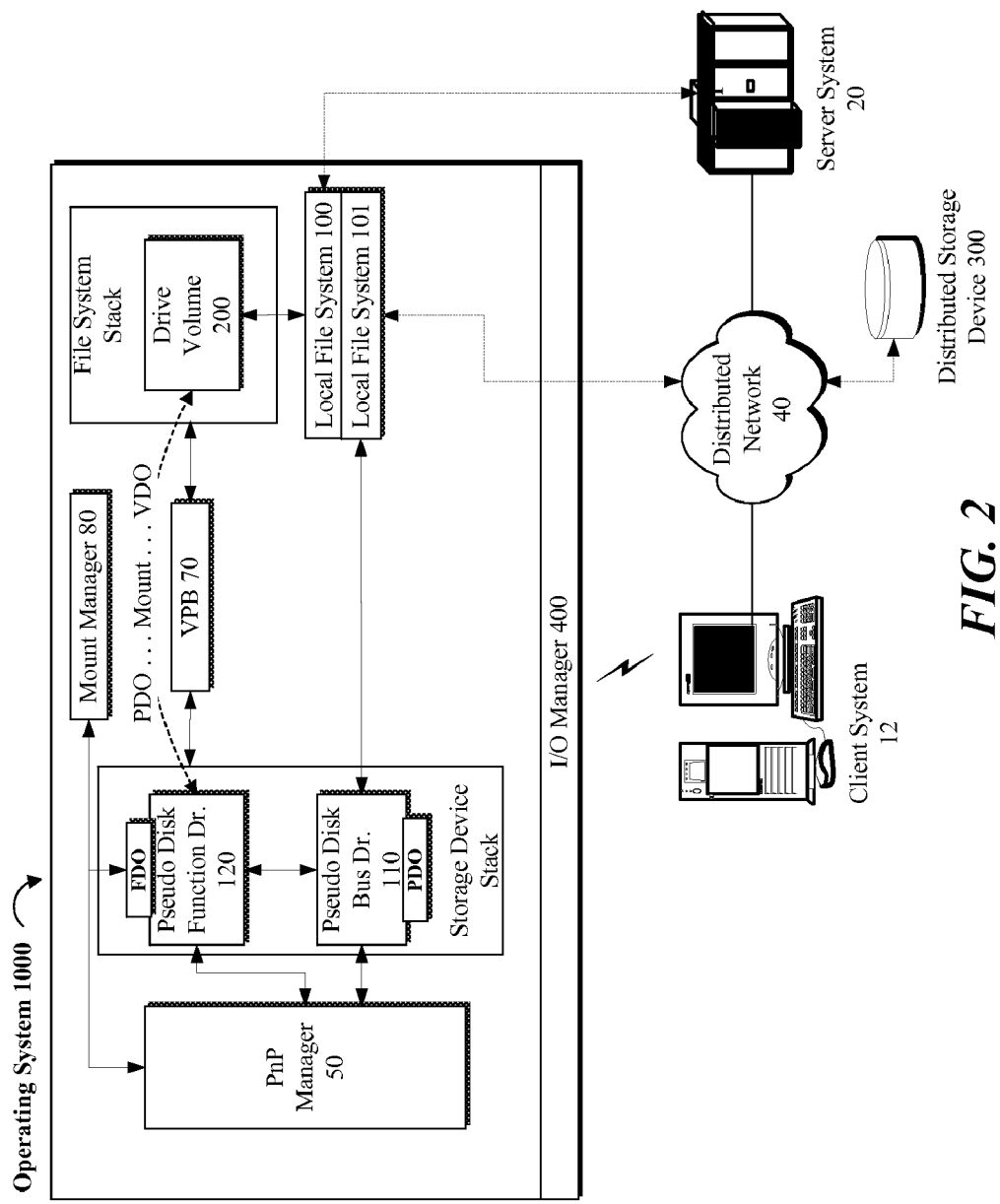
FIG. 2 illustrates a block diagram of an exemplary software environment for a client system connected to the distributed network shown in FIG. 1, in accordance with one embodiment.

Referring to FIG. 2, an exemplary client system 12 and its corresponding software environment are illustrated. As provided earlier, client 12 communicates with server system 20 to access one or more devices, such as a distributed storage device 300. Hereafter, we refer to distributed storage device 300 as the exemplary device connected to client system 12 via distributed network 40. It is noteworthy that the present invention can be implemented, in accordance with other embodiments, to provide access to any device in a distributed file system.

Furthermore, for the purpose of example, certain embodiments of the invention are disclosed herein with reference to the components of Microsoft Windows operating system (e.g., Windows 2003, Windows XP) and installable file system (IFS). Since as noted, the embodiments disclosed herein are by way of example, the disclosed principals, features, aspects and advantages of the invention can be equally applied to any operating system, file system or device without limitation.

As shown in FIG. 2, operating system 1000 controls the operation of client system 12. Operating system 1000 comprises an input/output (I/O) manager 400, a PnP manager 50 and a mount manager 80. I/O manager 400 controls data input and output to and from the system; PnP manager 50 controls connection and removal of devices to and from the system; and mount manager 80 associates the devices connect to client system 12 with a file system, as provided in further detail below.

In accordance with one aspect of the invention, I/O manager 400 is part of the operating system's 1000 kernel. I/O manager 400 manages I/O operations for client system 12. In one embodiment, I/O manager 400 is responsible for detecting new devices (e.g., SAN clusters) connected to the system via distributed network 40, and for providing access to the detected devices.

As shown in FIG. 2, in one embodiment, PnP Manager 50 is part of operating system 1000 and functions to manage one or more device drivers for devices connected to client system 12. Device drivers are executable logic code that provide an interface between operating system 1000 and the connected devices. As such, operating system 1000 controls a device to perform one or more device functions by way of the device drivers.

PnP manager 50 is used to automatically detect a device connected to the system bus (not shown) and to load the needed device drivers. A bus can be thought of as a hypothetical media on which a certain type (e.g., class) of objects can be plugged in and out. Hence, PnP manager 50 is responsible for detecting devices on the bus, sending proper event notifications for the detected devices, and identifying the device drivers loaded for each device.

PnP manager 50, preferably, manages disk bus drivers and disk function drivers for operating system's 1000 file system that comprises local file systems 100 and 101. Local file system 100 is a portion of a file system application programming interface (API) that enables operating system 1000 to recognize and load the requisite drivers. Local file system 101 is a portion of the file system API that provides an interface between local file system 100 and PnP manager 50. The disk bus driver is responsible for the detection and enumeration of physical disk devices that connect to client system 12 or distributed network 40, for example. The disk function driver provides the functionality for a physical disk device detected by the disk bus driver.

Figure 3:
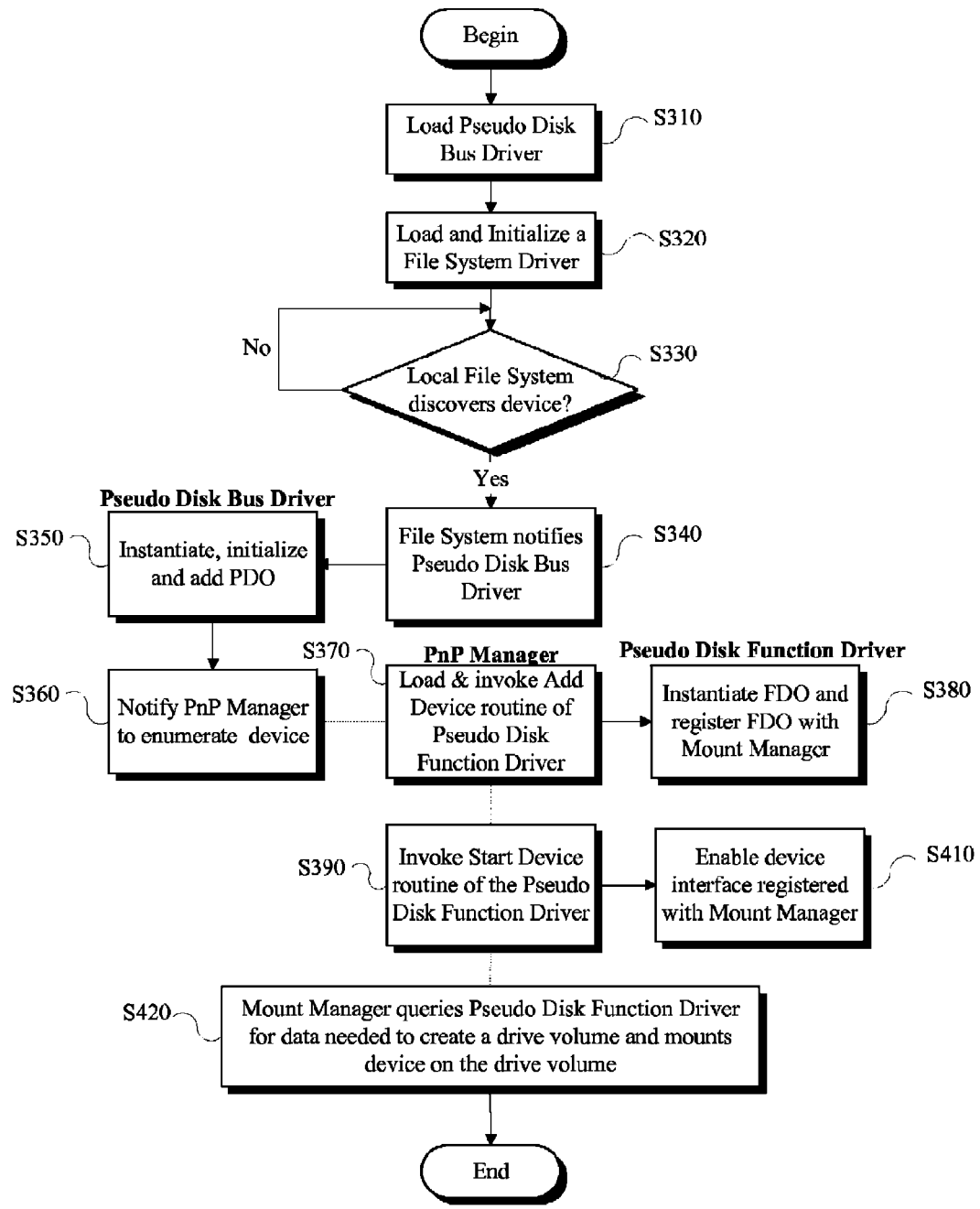
FIG. 3 illustrates a flow diagram of a method of detecting and mounting a device connected to a distributed network, in accordance with one embodiment.

FIG. 3 illustrates an exemplary flow diagram of a method of detecting and mounting a remote device on client system 12, using plug and play features of operating system 1000.

The process of FIG. 3 will be described with reference to FIG. 2. As shown in FIG. 3, pseudo disk bus driver 110 is loaded, preferable during boot operation, into memory of client system 12 (S310). Pseudo disk bus driver 110 is a disk bus driver implemented to enumerate distributed storage device 300, upon arrival of distributed storage device 300 on distributed network 40.

During enumeration, pseudo disk bus driver 110 creates and initializes device objects for distributed storage device 300 detected on the I/O bus (hereafter "the bus") of client system 12. In an exemplary embodiment, a pseudo disk function driver 120 is also loaded and installed, preferably during the boot operation, in association with pseudo disk bus driver 110. Pseudo disk function driver 120 is logically associated with pseudo disk bus driver 110 to control the operation of the distributed storage device 300.

The association between pseudo disk bus driver 110 and pseudo disk function driver 120 is registered with PnP manager 50, so that objects instantiated by pseudo disk bus driver 110 are automatically linked to and managed by pseudo disk function driver 120. Pseudo disk function driver 120, in an exemplary embodiment, provides the operational interface for distributed storage device 300, and controls the respective I/O and power management policies.

In one embodiment, pseudo disk bus driver 110 and pseudo disk function driver 120 support windows device model (WDM). WDM provides a framework for developing device drivers that support plug and play functionality, such that PnP manager 50 can direct device drivers to control their respective devices. PnP manager 50 communicates with pseudo disk bus driver 110, preferably, by way of I/O request packets (IRPs). IRPs direct distributed storage device 300 to start, stop or be prepared for removal from the bus, for example.

Referring back to FIG. 3, the operating system 1000 is configured to load and initialize a file system driver for client system 12 (S320). Local file system 100 is preferably a portion of the file system driver logic code that executes in the context of the application to which an I/O request is dispatched. In certain embodiments, local file system 101 is either a portion of the file system driver logic code or a separate module, which is preferably loaded by operating system 100 during boot operation. Local file system 101 is implemented to interface between local file system 101 and pseudo disk bus driver 110.

During initialization, local file system 100 communicates with known nodes in distributed network 40. Local file system 100 scans distributed network 40 to discover distributed storage device 300 (S330). In response to detection of distributed storage device 300 by local file system 100, local file system 101 notifies pseudo disk bus driver 110 of the arrival of distributed storage device 300 on the bus (S340). Local file system 100 may continue to periodically scan the network for additional distributed storage devices 300 (S330).

Upon receiving an arrival notification from local file system 101, pseudo disk bus driver 110 instantiates a physical device object (PDO), initializes the physical device object, and adds the physical device object to a device list (S350). The device list comprises the list of devices that pseudo disk bus driver 110 manages. Pseudo disk bus driver 110 then notifies PnP 50 to enumerate distributed storage device 300 on the bus (S360). In this manner, distributed storage device 300 is identified and pseudo disk function driver 120 is assigned to control distributed storage device's 300 functionality.

In an exemplary embodiment, a Microsoft API "IoInvalidateDeviceRelations" is used to notify PnP manager 50 of arrival of distributed storage device 300. This API preferably comprises logic code that upon execution notifies PnP manager 50 of changes in the status of distributed file system device (e.g., arrival/removal), so that PnP manager 50 can start sending the relevant IRPs and load the proper function drivers to address the change in status.

The following exemplary code represents a declaration for IoInvalidateDeviceRelations API routine:

```
VOID
    IoInvalidateDeviceRelations(
        IN PDEVICE_OBJECT DeviceObject,
        IN DEVICE_RELATION_TYPE Type
        );
Parameters
    DeviceObject
        Pointer to the physical device object for the
        distributed storage device 300.
    Type
        Specifies the type of relations that have changed.
        Possible values include BusRelations,
        EjectionRelations, RemovalRelations and
        TargetDeviceRelation.
```

Referring again to FIGS. 2 and 3, in one or more embodiments, PnP manager 50 loads and invokes add device routine of pseudo disk function driver 120 (S370). The add device routine causes pseudo disk function driver 120 to instantiate a functional device object (FDO) for distributed storage device 300 and register the functional device object with mount manager 80 (S380). The functional device object is a logical object that represents a distributed storage device 300 to pseudo disk function driver 120. In an exemplary embodiment, the functional device object is instantiated using IoCreateDevice API routine to create an unnamed functional device object for use by pseudo disk function driver 120.

In an exemplary embodiment, the following represents a declaration for the IoCreateDevice API routine, for example:

```
NTSTATUS
    IoCreateDevice(
        IN PDRIVER_OBJECT DriverObject,
        IN ULONG DeviceExtensionSize,
        IN PUNICODE_STRING DeviceName
        IN DEVICE_TYPE DeviceType,
        IN ULONG DeviceCharacteristics,
        IN BOOLEAN Exclusive,
        OUT PDEVICE_OBJECT *DeviceObject
        );
```

Mount manager 80 is responsible for making distributed storage device 300 available to client system 12 as if distributed storage device 300 is a locally attached storage device. In one embodiment, PnP manager 50 invokes the start device routine of pseudo disk function driver 120 (S390). By way of the start device routine, pseudo disk function driver 120 enables the device interface registered with the mount manager 80 (S410) and informs mount manager 80 that distributed storage device 300 is now available for access.

As part of enabling the device interface, mount manager 80 queries pseudo disk function driver 120 for data needed to create a drive letter (hereafter "drive volume 200") and mounts the detected distributed storage device 300 on the drive volume 200 (S420). The drive volume 200 represents a point of attachment on which operating system 1000 and applications running on top of operating system 1000 can mount distributed storage device 300. The mounting process is performed based on a logical association between functional device object and drive volume 200, as provided in further detail below.

In accordance with one aspect of the invention, the following mount process is disclosed with reference to an exemplary embodiment implemented in the Microsoft Windows operating system environment. It is noteworthy that the invention should not be construed as limited to the following exemplary embodiment, however. The teachings and principals disclosed herein may be equally applied in other operating environments.

Referring back to FIG. 2, local file system 100 creates a file system volume device object (VDO) to represent drive volume 200. In an exemplary embodiment, I/O manager 80 defines a volume parameter block (VPB) 70 that includes information to identify whether the functional device object is mounted on drive volume 200. More particularly, volume parameter block 70 is a data structure that can be utilized by I/O manager 80 to map the functional device object to the volume device object, for example.

In one embodiment, when operating system 1000 or other application requests a read or write access to drive volume 200, I/O manager 400 examines volume parameter block 70 to determine whether the corresponding functional device object is mounted on or claimed by local file system 100. If I/O manager 400, based on information included in volume parameter block 70, determines that the functional device object is not mounted on drive volume 200, I/O manager 400 invokes file system 100 to recognize and claim the functional device object.

Once local file system 100 claims the functional device object, local file system 100 creates a volume device object, so that the functional device object is mounted on the volume device object by way of I/O manager 400. I/O manager 400 mounts the functional device object on the volume device object by causing local file system 100 to initialize volume parameter block 70 with the proper parameters. These parameters provide an association between the functional device object and driver volume's 200 volume device object. Thus, the association between the functional device object and drive volume 200 is established as a part of the mount process.

After mounting of the functional device object on device volume 200, I/O manager 400 reroutes requests for accessing distributed file system 300 to drive volume 200. In an exemplary embodiment, volume parameter block 70 provides an association between the functional device object and the volume device object. Once the association between the functional device object and the volume device object is established, I/O Manager 400 can redirect the I/O calls to the volume device object on behalf of the functional device object.

Accordingly, distributed storage device 300 is added to the bus, when pseudo disk function driver 120 registers the functional device object as, for example, a disk-class-type via a globally unique identifier (GUID) to the system. The PnP hierarchy makes the functional device object visible to all upper layer drivers such as the partition manager (e.g., partmgr), volume manager (e.g., DMIO, ftdisk, etc.), and mount manager 80. PnP manager 50 notifies all registered applications of the arrival of the functional device object.

In accordance with another aspect of the invention, distributed storage device 300 is removed from the bus upon detecting an event such as server 20 or client system 12 shutting down, loss of connection to the distributed network 40, or removal of distributed storage device 300 from distributed network 40. When local file system 100 detects the loss of distributed storage device 300, local file system 101 notifies pseudo disk bus driver 110 about the removal event. Pseudo disk bus driver 110 then removes the physical device object from its device list and informs PnP manager 50 of the removal.

In one embodiment, to complete the removal process, PnP manager 50 calls the remove device routine (not shown) of pseudo disk function driver 120. In response, pseudo disk function driver 120 disables one or more active interfaces associated with the functional device object, and notifies mount manager 80 to delete the corresponding drive volume 200. Pseudo disk function driver 120 preferably also deletes the functional device object associated with distributed storage device 300. In an exemplary embodiment, "IoInvalidateDeviceRelations" API for bus relations is used to notify the PnP manager 50 of the removal process, so that PnP manger 50 can send the relevant IRPs to the system drivers and unload pseudo disk function driver 120.

It is noteworthy that the above procedures and their respective subprocesses can be performed in any order or in parallel, regardless of numeral references associated therewith. In different embodiments, the invention can be implemented either entirely in the form of hardware or entirely in the form of software, or a combination of both hardware and software elements. For example, server system 20 or client system 12 may comprise a controlled computing system environment that can be presented largely in terms of hardware components and software code executed to perform processes that achieve the results contemplated by the system of the present invention.

Figure 4A:
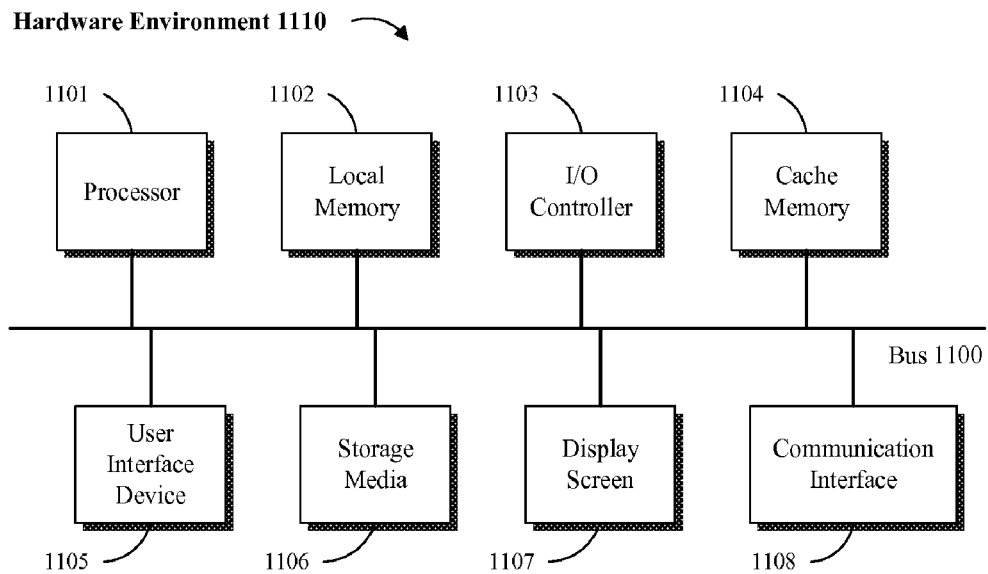
FIGS. 4A and 4B are block diagrams of hardware and software environments in which a system of the present invention may operate, in accordance with one or more embodiments.
Figure 4B:
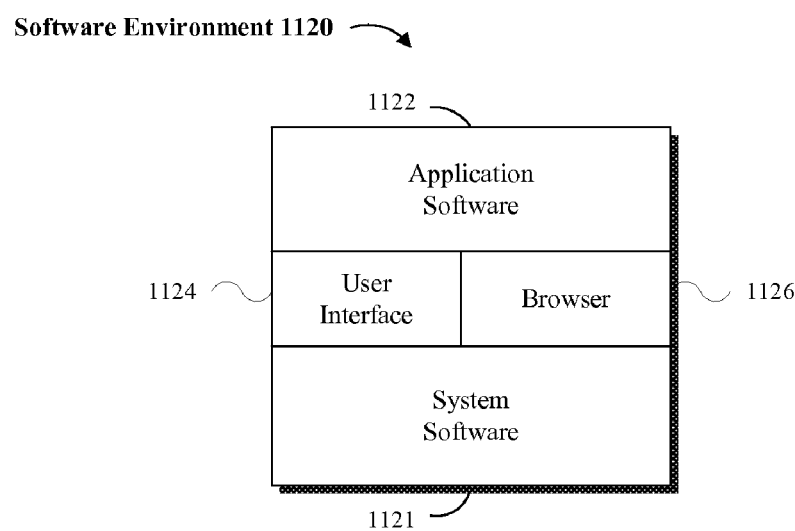

Referring to FIGS. 4A and 4B, a computing system environment in accordance with an exemplary embodiment is comprises a hardware environment 1110 and a software environment 1120. The hardware environment 1110 comprises the machinery and equipment that provide an execution environment for the software; and the software provides the execution instructions for the hardware.

The software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 1120 is divided into two classes comprising system software 1121 and application software 1122. System software 1121 comprises control programs, such as the operating system (OS) and information management systems that instruct the hardware how to function and process information.

In an exemplary embodiment, operating system 1000 is implemented as system software 1121 executed on client system 12 or one or more hardware environments to automatically detect distributed storage device 300 connected to distributed network 40. System software 1121 may comprise but is not limited to program code, data structures, firmware, resident software, microcode or any other form of information or routine that may be read, analyzed or executed by a controller or processor.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with an instruction execution system, apparatus or device (e.g., computer).

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD).

Referring to FIG. 4A, an embodiment of system software 1121 can be implemented as computer software in the form of computer readable code executed on a data processing system such as hardware environment 1110 that comprises a processor 1101 coupled to one or more memory elements by way of a system bus 1100. The memory elements, for example, can comprise local memory 1102, storage media 1106, and cache memory 1104. Processor 1101 loads executable code from storage media 1106 to local memory 1102. Cache memory 1104 provides temporary storage to reduce the number of times code is loaded from storage media 1106 for execution.

A user interface device 1105 (e.g., keyboard, pointing device, etc.) and a display screen 1107 can be coupled to the computing system either directly or through an intervening I/O controller 1103, for example. A communication interface unit 1108, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 1110 may not include all the above components, or may comprise other components for additional functionality or utility. For example, hardware environment 1110 can be a laptop computer or other portable computing device embodied in an embedded system such as a set-top box, a personal data assistant (PDA), a mobile communication unit (e.g., a wireless phone), or other similar hardware platforms that have information processing, data storage or communication capabilities.

In some embodiments, communication interface 1108 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 4B, system software 1121 can comprise one or more computer programs that are executed after being loaded from storage media 1106 into local memory 1102. In a client-server architecture, system software 1121 may comprise client software and server software. For example, in one embodiment of the invention, client software is executed on client system 12 and server software is executed on server system 20.

Software environment 1120 may also comprise browser software 1126 for accessing data available over local or remote computing networks. Further, software environment 1120 may comprise a user interface 1124 (e.g., a graphical user interface (GUI)) for receiving user commands and data. Please note that the hardware and software architectures and environments described above are for purpose of example, and one or more embodiments of the invention may be implemented over any type of system architecture or processing environment.

It should also be understood that the logic code, programs, modules, processes, methods and the order in which the respective steps of each method are performed are purely exemplary. As noted earlier, depending on implementation, the steps can be performed in any order or in parallel, unless indicated otherwise in the present disclosure. Further, the logic code is not related, or limited to any particular programming language, and may comprise of one or more modules that execute on one or more processors in a distributed, non-distributed or multiprocessing environment.

The present invention has been described above with reference to exemplary features and embodiments. Those skilled in the art will recognize, however, that changes and modifications may be made in these exemplary embodiments without departing from the scope of the present invention. These and various other adaptations and combinations of the embodiments disclosed are within the scope of the invention and are further defined by the claims and their full scope of equivalents.

What is claimed is:

1. A method for managing a device in a distributed file system, the method comprising:

loading a disk bus driver in a memory of a first computing system to manage enumeration of a device remotely connected to the first computing system in a distributed network;

instantiating a physical device object, in response to a file system driver of the first computing system detecting the device;

loading a disk function driver in the memory to manage access to the device;

notifying a plug and play manager of the first computing system to enumerate the device;

instantiating and registering a functional device object with a mount manager of the first computing system;

associating the functional device object with the physical device object;

the first computing system directly accessing the device, in response to receiving a data request to access data stored on the device, wherein the disk bus driver loaded in the memory of the first computing system instantiates the physical device object and notifies the plug and play manager of the first computing system to enumerate the device to cause the disk function driver loaded in the memory of the first computing system to instantiate and register the functional device object, and wherein an association between the functional device object and a logical drive volume is established as a part of a mount process for mounting the functional device object on a volume device object for the device;

instantiating the volume device object for the logical drive volume mapped to the device;

enabling an interface mechanism of the functional device object; and mounting the functional device object on the volume device object, wherein the mount manager mounts the volume device object on the functional device object by causing the file system driver to initialize a volume parameter block used by an input/output (I/O) manager of the first computing system to map the physical device object to the volume device object.

2. The method of claim 1, wherein the plug and play manager causes the disk function driver to enable the interface mechanism of the functional device object.

3. The method of claim 1, wherein the volume parameter block is a data structure comprising information about whether the functional device object is mounted on the drive volume.

4. The method of claim 1, wherein the I/O manager examines the volume parameter block to determine if the functional device object for the device is claimed by a local file system of the first computing system.

5. The method of claim 4, wherein in response to determining that the functional device object is claimed by the local file system, the local file system instantiates the volume device object.

6. The method of claim 1, further comprising forwarding requests submitted by an application for accessing the physical device object to the volume device object.

7. The method of claim 6, further comprising:
notifying the disk bus driver to remove the physical device object from a device list, in response to the file system driver detecting removal of the device from the distributed network;
disabling the interface mechanism of the functional device object; and
notifying the mount manager to delete the drive volume associated with the device.

8. The method of claim 7, wherein the disk function driver disables the interface mechanism of the functional device object and notifies the mount manager to delete the drive volume.

9. A computer program product for managing a device in a distributed file system, the computer programming product comprising a tangible computer readable storage medium having a computer readable program stored thereon, wherein the computer readable program when executed on a first computer causes the first computer to:
load a disk bus driver in a memory of the first computer to manage enumeration of a device remotely connected to the first computer in a distributed network;
instantiate a physical device object, in response to a file system driver of the first computer detecting the device;
load a disk function driver in the memory to manage access to the device;
notify a plug and play manager of an operating system executed on the first computer to enumerate the device;
instantiate and register a functional device object with a mount manager of the first computer; and
associate the functional device object with the physical device object; and
directly access the device by the first computer, in response to receiving a data request to access data stored on the device,
wherein the disk bus driver loaded in the memory of the first computer instantiates the physical device object and notifies the plug and play manager of the first computer to enumerate the device to cause the disk function driver loaded in the memory of the first computer to instantiate and register the functional device object, and
wherein an association between the functional device object and a logical drive volume is established as a part of a mount process for mounting the functional device object on a volume device object for the device, enable an interface mechanism of the functional device object; and
mount the functional device object on the volume device object,
wherein the mount manager mounts the volume device object on the functional device object by causing the file system driver to initialize a volume parameter block used by an input/output (I/O) manager of the first computer to map the physical device object to the volume device object.

10. The computer program product of claim 9, wherein the computer readable program when executed on the first computer further causes the first computer to instantiate the volume device object for the logical drive volume mapped to the device.

11. The computer program product of claim 9, wherein the volume parameter block is a data structure comprising information about whether the functional device object is mounted on the drive volume.

12. The computer program product of claim 11, wherein the I/O manager examines the volume parameter block to determine if the functional device object for the device is claimed by a local file system of the first computer.

13. A system for managing a device in a distributed file system, the system comprising:
one or more processors an operating system of a first computing system, wherein the operating system comprises:
a logic unit for loading a disk bus driver to manage enumeration of a device remotely connected to the first computing system in a distributed network, wherein the device is attached to a second computing system in the distributed network;
a logic unit for instantiating a physical device object, in response to a file system driver of the first computing system detecting the device;
a logic unit for loading a disk function driver to manage access to the device;
a memory in which the operating system loads the disk bus driver and the disk function driver;
a logic unit for notifying a plug and play manager of the first computing system to enumerate the device;
a logic unit for instantiating and registering a functional device object with a mount manager of the first computing system;
a logic unit for associating the functional device object with the physical device object;
a logic unit for instantiating a volume device object for a logical drive volume mapped to the device;
a logic unit for enabling an interface mechanism of the functional device object;
a logic unit for mounting the functional device object on the volume device object; and
a logic unit for directly accessing the device, in response to receiving a data request to access data stored on the device,
wherein the disk bus driver loaded in the memory of the first computing system instantiates the physical device object and notifies the plug and play manager of the first computing system to enumerate the device to cause the disk function driver loaded in the memory of the first computing system to instantiate and register the functional device object, and wherein an association between the functional device object and the logical drive volume is established as a part of a mount process for mounting the functional device object on the volume device object for the device; and wherein the mount manager mounts the volume device object on the functional device object by causing the file system driver to initialize a volume parameter block used by an input/output (I/O) manager of the first computer to map the physical device object to the volume device object.

* * * * *